(12) United States Patent
Schmid et al.

(10) Patent No.: US 6,894,411 B2
(45) Date of Patent: May 17, 2005

(54) ELECTRIC MACHINE DESIGNED AS A STARTER, GENERATOR OR STARTER-GENERATOR FOR A MOTOR VEHICLE

(75) Inventors: Ralf Schmid, Kaltental (DE); Marco Schmidt, München (DE)

(73) Assignee: Continental ISAD Electronic Systems GmbH & Co., oHG, Landsberg (DE)

( * ) Notice: Subject to any disclaimer, the term of this patent is extended or adjusted under 35 U.S.C. 154(b) by 47 days.

(21) Appl. No.: 10/667,017

(22) Filed: Sep. 17, 2003

(65) Prior Publication Data

US 2005/0040716 A1 Feb. 24, 2005

(30) Foreign Application Priority Data

Sep. 18, 2002 (EP) .......................................... 02020893

(51) Int. Cl.[7] .............................................. H02K 11/00
(52) U.S. Cl. ...................................... 310/71; 310/68 R
(58) Field of Search ............................ 310/67 R, 68 R, 310/71, 89, 179, 184, 198

(56) References Cited

U.S. PATENT DOCUMENTS

| | | | | |
|---|---|---|---|---|
| 4,484,116 A | * | 11/1984 | Ellicott et al. | ............... 388/816 |
| 4,754,207 A | | 6/1988 | Heidelberg et al. | |
| 4,913,258 A | * | 4/1990 | Sakurai et al. | ............... 180/242 |
| 5,274,287 A | * | 12/1993 | Bahn | ........................ 310/68 B |
| 5,491,370 A | | 2/1996 | Schneider et al. | |
| 5,677,580 A | * | 10/1997 | Huang | ......................... 310/44 |
| 5,780,949 A | * | 7/1998 | Li | .............................. 310/198 |
| 6,097,127 A | | 8/2000 | Rivera | |
| 6,177,734 B1 | | 1/2001 | Masberg et al. | |
| 6,279,336 B1 | | 8/2001 | Grundl et al. | |
| 2001/0021115 A1 | | 9/2001 | Grundl et al. | |

FOREIGN PATENT DOCUMENTS

| | | |
|---|---|---|
| DE | 44 22 622 A1 | 1/1996 |
| DE | 197 13 984 A1 | 10/1998 |
| DE | 198 26 731 A1 | 12/1999 |
| DE | 199 45 368 A1 | 3/2001 |
| DE | 100 55 750 A1 | 12/2001 |
| GB | 1 207 666 | 10/1970 |
| JP | 09-331694 | 12/1997 |
| WO | WO 97/08456 | 3/1997 |
| WO | WO 01/95461 A1 | 12/2001 |

\* cited by examiner

*Primary Examiner*—Thanh Lam
(74) *Attorney, Agent, or Firm*—Blakely, Sokoloff, Taylor & Zafman; Stephen M. De Klerk

(57) ABSTRACT

An electric machine designed as a starter, generator, or starter-generator for a motor vehicle and presenting a housing, wherein said housing comprises a winding with coils or coil groups including connector heads. It comprises power electronics units with power switch components distributed along the perimeter of the housing, as well as conductor rails connected with power electronics units, and coil exit rails going from a power electronics unit to an associated coil or coil group. Said power electronics units are arranged on the face of the housing in a clearance created by the connector heads, which are located radially outside or inside the connector heads. Said power switch components comprise a contact area and are arranged directly—without inserted electric insulation—on one of the power loops or a coil exit rail.

25 Claims, 9 Drawing Sheets

ELECTRIC MACHINE DESIGNED AS A STARTER, GENERATOR OR STARTER-GENERATOR FOR A MOTOR VEHICLE

CROSS-REFERENCE TO RELATED APPLICATIONS

The present patent application claims priority from European Patent Application No. EPO 02 020 893.0, filed on Sep. 18, 2002.

FIELD OF THE INVENTION

The invention generally concerns electric machines and, for example, an electric machine designed as a starter, generator, or starter-generator for a motor vehicle.

BACKGROUND OF THE INVENTION

An electric machine of this type is known from DE 199 45 368 A1. The electric machine (not described in further detail in said patent) comprises a stator holder presenting five power electronics modules comprising power semiconductors with drive electronics and condensers. This arrangement is intended for cooling the electronics by means of the wall of the stator holder. For this purpose, the power semi-conductors of the power electronics module are provided with electronic insulators connected in series with the stator holder.

A combined starter-generator for a motor vehicle is known from WO 97/08456, for example. Said combined starter-generator is a so-called crankshaft machine, i.e., a machine without bearings resting on the crankshaft of a combustion engine, i.e. on the side where the clutch is located in a motor vehicle with shift transmission, or on the side where the so-called semi-flexible tile is located of a motor vehicle with automatic transmission. The described electric machine is an induction machine with three phases. The three-phase alternate currents required for the power supply are produced with a current inverter supplying the necessary currents based upon a so-called indirect direct current with an electronic power switch. This is done by means of pulse-width modulation, which is rated in such a way that the amplitude, frequency and phase of the pulse-modulated voltage is in line with the desired alternate current. Based upon the inductivity of the electric machine, the winding of said machine acts as a low-pass, in which the currents flowing through correspond approximately with the desired three-phase alternate currents. Each phase can have a plurality of said power switches placed in parallel inside the current inverter. The power electronics are located in a housing separated from the machine, in which the power switches are submerged in an evaporated boiler. The current inverter and the electric machine of said device are generally connected with a tri-rod connection cable suitably dimensioned for the high currents.

WO 01/95461 A1 describes a structural part winding for a starter-generator made of L- (and in part also U-) shaped structural parts, which are layered and welded into the housing slots. The winding is also configured for a three-phase power supply, which means that it also comprises three partial phase windings. In turn, each partial phase winding made by parallel switching a plurality of coils. Lines running along the face of the housing and individually connecting both sides of a coil create so-called connector heads. Said connector heads of this type of structural part winding are very compact. Three annular conductor rails are spaced around the outside radius of the connector heads. The windings of each corresponding partial phase winding are connected in parallel with said conductor rails, which will in turn be connected with an external rotary current.

DE 198 26 731 A1 describes a half bridge structural component creating current inverters supplying power to induction machines. A half bridge circuit comprises at least two semiconductor switches connected in series by means of a so-called half bridge. A plurality of said serial connections are again connected in parallel. The source connections of the semi-conductor switches (MOSFETs) are soldered on metallic conductor rails.

U.S. Pat. No. 6,097,127 describes a multipolar electronically commutated direct current machine, wherein each single coil may be individually switched electronically. The electronic switches are spaced around the axis of the housing.

JP 09 331694 A describes an electric machine with a three-phase winding comprising a plurality of unconnected partial phase windings, each partial phase winding being powered by its own power electronics unit.

U.S. Pat. No. 4,754,207 describes an electric machine comprising groups of electromagnets belonging to one single phase. The electromagnets of a group can be switched simultaneously or at different times.

DE 44 22 622 A1 describes an electric machine with a polygon switch, wherein each polygon connection can be connected with a positive or negative potential by means of a power switch unit, and provided with power electronics units spaced around the axis of the housing.

FIGS. 8 and 9 of GB 1 207 666 A present an electric machine wherein the power switches of the current inverter are distributed across the housing. In one embodiment, the power switches are arranged on a housing extension, spaced around the axis of one of the winding heads.

SUMMARY OF THE INVENTION

A first feature of the present invention is aimed at an electric machine designed as a starter, generator, or starter-generator for a motor vehicle. The electric machine has a housing comprising a winding having coils or coil groups with connector heads, power electronics units spaced around the housing, power switch members, and conductor rails connected with the power switch units, and coil exit rails running from one power electronics unit to an assigned coil or coil group. The power electronics units are located in the face of the housing in a clearance provided by the connector heads and radially located outside or inside the connector heads. One contact surface of the power switch member rests directly, without inserted electric insulation, on the power loops or a coil exit line.

A second feature is aimed at an electric machine designed as a starter, generator, or starter-generator for a motor vehicle. Following the second feature, the electric machine presents a housing comprising the following: A winding with coils or coil groups having connector heads; power electronics units spaced around the housing and having power switch members. Said power electronics units are located in the face of the housing in a clearance provided by the connector heads and radially located outside or inside the connector heads. Said power switch members present a contact surface arranging them on a support. The contact surface of said power switch members is arranged in parallel with a radial surface of the housing.

A third feature is aimed at an electric machine designed as a starter, generator, or starter-generator for a motor vehicle.

Following the third feature, the electric machine comprises the following: A winding with coils or coil groups having connector heads; power electronics units spaced around the housing and having power switch members; conductor rails coupled with power electronics units. Said power electronics units are located in the face of the housing in a clearance provided by the connector heads and radially located outside or inside the connector heads. At least one conductor rails is shaped like a duct designed to receive a coolant flow, and the power switch components are in thermal contact with at least one conductor rail receiving a coolant.

Other features are inherent in the disclosed products and methods or will become apparent to those skilled in the art from the following detailed description of embodiments and its accompanying drawings.

DESCRIPTION OF THE DRAWINGS

Embodiments of the invention will now be described, by way of example, and with reference to the accompanying drawing, in which.

Figure 1:
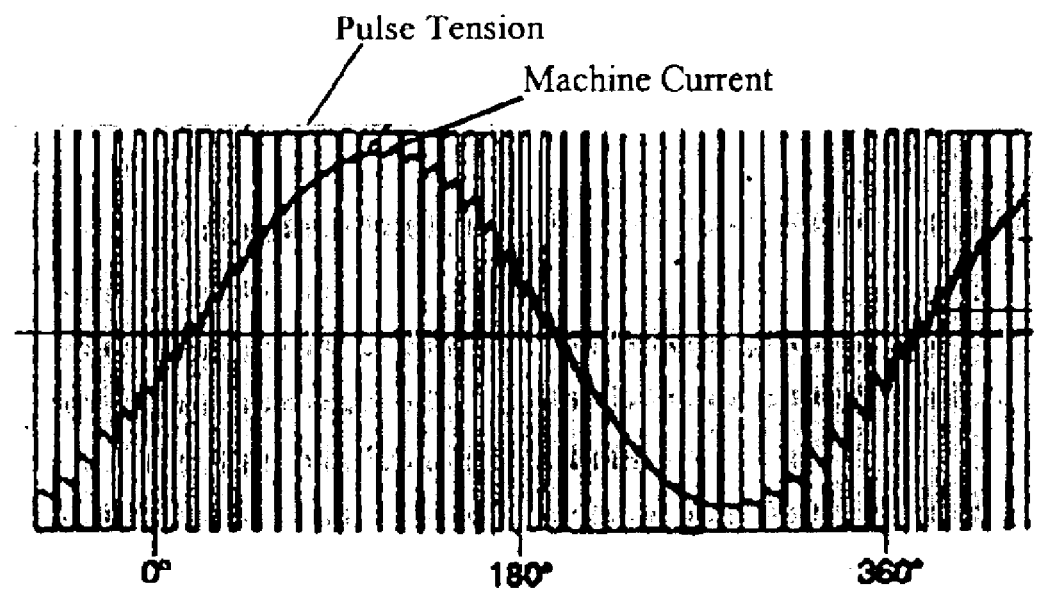
FIG. 1 is a schematic view showing the creation of an approximate sinusoidal current by means of clocked voltage.

Parts with the same or similar functions are partially indicated in the figures with the same reference.

DESCRIPTION OF THE PREFERRED EMBODIMENTS

Before describing the figures in further detail, a few remarks will be made concerning the embodiments.

The power switch of the power electronics units of the embodiments are intended to create an (effective) alternate current from a distribution direct current with the appropriate amplitude, frequency and phase for the desired rotary field. This is done by having the power switches turned on and off with a docked frequency which is large (e.g. 5 to 100 kHz) compared with the rotary frequency of the rotary field (typically 10 to 100 s$^{-1}$ for motor vehicles), and in which the pulses are modulated in accordance with the desired alternate current. In case of a pulse-width modulation, by way of example, the so-called valuation of the modulation takes place in such a way that the pulse-modified voltage in the temporary means basically corresponds with the desired alternate current. As mentioned earlier, the electric machine acts as a low-pass based upon its inductivity, whereby the currents flowing through the winding correspond approximately with the desired alternate currents.

Means of polyphase voltages and currents create the rotary fields. The three-phase system with a phase difference between the individual phases is 120° is the simplest and therefore most used method. In those cases in which an extremely high uniformity of the rotary fields is desired, systems with a higher number of phases, e.g. 5, 7, 12 phases, and a corresponding smaller phase difference can be used.

When supplied with a polyphase current, the winding comprises partial phase windings enabling said winding to produce the desired rotary field, i.e., one partial phase winding per phase. The term "partial winding" does not refer to the spatial distribution of the winding in separate sectors since the different partial phase windings generally overlap in a spatial sense. The term "partial winding" much rather summarizes in an electric-functional sense those coils of a winding belonging to one phase and traversed with currents having a basically identical phase angle. In conventional windings, all coils of a partial phase winding are generally wired in series and/or parallel. Said coils are commonly referred to as a "branch". Since certain embodiments, which are explained in further detail below, do not present said winding in parallel of coils belonging to a phase, the term "partial phase winding" is used instead of "branch". It is possible, however, that each partial phase winding has only one coil, especially in case of multi-phased machines.

The embodiments comprise a winding composed of coils, i.e., helix bodies, in which the helix axis is basically oriented in a radial direction. In the context of the present invention and embodiments, the term "coil" also refers to a serial connection of said coils (which are then referred to as "partial coils"). By way of example, a serial connection with, for example, a partial coil running from the outside radius to the inside radius, where it is connected with another partial coil running from the outside radius to the inside radius, presents a simple connection of coils of one serial connection, as described in further detail in the above-mentioned WO 01/95461 A1.

In some embodiments, each partial phase winding comprises at least two coils (whereas other embodiments only comprise one coil). For a conventional winding, in which, as mentioned above, all coils of a partial phase winding are generally wired with one another, this would mean that each branch comprises one connection of coils placed in parallel. These coils can only be considered as connected in parallel in a functional sense. In other embodiments, some instead of all coils of a partial phase winding are wired in parallel, and are here referred to as "coil groups". A partial phase winding comprising a total of six coils wired in parallel by two at a time, for example, would present a partial phase winding comprising three coil groups.

In certain embodiments, each partial phase winding has at least two power electronics units, which are individually electrically connected with one coil or a coil group of the partial phase winding. This means that only part of the current for a certain phase flows through a power electronics unit. The partial current in said embodiments refers to the current flowing through the coil or coil groups assigned to the power electronics unit. In some of these embodiments, all coils are provided with their own power electronics unit, meaning that there are no coils wired in parallel (i.e., coil groups). In other embodiments, a power electronics unit is assigned to each partial phase winding.

The housing winding of a rotary field machine generally presents "connector heads", which are commonly referred to as "winding heads" in the case of conventional wire windings. The connector heads are arranged outside the housing body on the axis of both face sides of said housing in a radial field machine with a housing body made of a sheet metal assembly. This requires a bundle of lines, which all individually connect the coil sides located in a slot of said sheet metal assembly. In case of the above-mentioned overlapping coil arrangement, each connector heads comprises one connector line belonging to a plurality of coils and having to be appropriately arranged along one another.

Several known options exist for this. In conventional wire windings, the winding is arranged in a coil pattern; the connector lines of a coil are bundled, and the bundles of the overlapping coils are guided along one another by radially and/or axially evading them from one another. DE 100 55 750 A1 suggests such a solution for structural part windings. WO 01/95461 A1 mentioned above presents a different connector head design comprising windings composed of layers rather than coils. In said design, the connector lines of the overlapping coils are joined by cogging.

Both options allow the connector heads to create a clearance, which can be loop-shaped, for example. This clearance is located at the face of the machine in the area of the housing which does not have slots, i.e., upwards along the back of the housing where the magnetic return takes place. In internal rotor machines, this clearance is located at outside radius of the connector heads; in external rotor machines (which will hereinafter not be mentioned anymore, but are also included), on the other side, the clearance is located inside the connector heads. Said embodiments use the clearance provided by the connector heads to accommodate the power electronics units spaced along the perimeter. Therefore, said power electronics units can be arranged in the immediate proximity of the connector heads—and consequently the coil ends—of the coils assigned thereto.

In certain embodiments, the feature of a structure with at least two coils or coil groups of one partial phase winding and each having one power electronics unit, is combined with the arrangement of the clearance provided by the connector heads. However, this is not coercive. It rather includes embodiments, in which only one power electronics unit has been assigned to each partial phase winding, whereby said power electronics units are nonetheless arranged at the face of the housing in the clearance made available by the connector heads.

Even though the embodiments can also have wire windings, the embodiments described in further detail comprise a structural part winding, more or less like the type described in WO 01/95461 A1, in which the overlapping coils of the winding are composed of layered structural parts, and therefore present connector heads composed of stratified structural part connector lines, in which the connector lines of multiple coils are joined by cogging. For this reason, the structural parts in the connector line area are flatter than those in the slots. Such connector heads extend outwards from the axis of the housing and thus provide said clearance located inside or outside the radius and in which the power electronics units can be placed.

It is known from the above-mentioned WO 01/95461 A1 that the housing can have alternate current rails supplying the polyphase alternate current created by the separate current inverter to the parallel connected coils, whereby the number of alternate current rails corresponds with the number of phases. In certain embodiments, the housing comprises direct current rails, e.g. with a positive and a negative rail electrically connecting the power electronics units spaced along the perimeter. An external direct current source such as a battery supplies the direct current rails. The battery and the direct current rails combined with a supply create a so-called intermediate circuit, provided there is a voltage transformer or another separative element between said battery and said direct current rails. By proceeding as described above, the power switches of the power electronics units create the alternate currents desired for the creation of a rotary field from the direct current at the direct current rails, but only directly at the corresponding coils or coil groups.

Whereas the alternate current rails known from WO 01/95461 A1 completely fill up the clearance made available by the connector heads on one side of the housing, the situation is completely different in the case of the direct current rails of the present embodiments: Even though said direct current rails are indeed also arranged in an annular pattern in the clearance provided by the connector heads, they do not completely fill up said clearance. Indeed, on one side, the number of direct current rails is smaller than that required for alternate current rails (only two direct current rails as opposed to three alternate current rails for a three-phase system); on the other side, it has been found that the overall diameter of direct current rails of an identical machine embodiment can be smaller than that of the corresponding alternate current rails since the direct current embodiment has no or only few reactive components, whereas the alternate current embodiment generally has a large number of reactive components, resulting in the direct current embodiment having fewer currents. The space saved in these embodiments is used to host the power electronics units. This means that both the direct current rails and the power electronics units are located in the entire clearance provided by the connector heads.

Common power switch members (e.g., MOSFETs) have a terminal (generally the source) configured as the contact area of the member housing. In certain embodiments, the contact areas of the power switch members are placed directly (e.g., soldered) and without inserted electric insulation on one of the conductor rails or a coil exit rail providing the power supply from the power electronics unit to the corresponding coil or coil groups. This is very important from a cooling-technical viewpoint. In some embodiments, the contact area is a direct area for the semiconductor rather than a housing contact area. The power semiconductor are, by way of example, directly, i.e., without a housing, soldered to the rails by means of a terminal area (e.g. the source), whereas the other terminals (e.g., drain, gate) are, by way of example, bonded to the semiconductor.

In certain embodiments, the supporting area of the power switch members is arranged parallel to a radial area of the housing in the clearance provided by the connector heads. The supporting area is the area over which the heath from the power switch member is dissipated. Said heat dissipation basically occurs perpendicularly to said area. In embodiments, in which the thermal and the electric contact are grouped, the above-mentioned contact area can be the supporting area, for example. In other embodiments, said supporting area can be insulated from the base. A radial surface is a surface oriented perpendicularly to the rotary axis of the electric machine. In the case of conductor rails layered in an axial direction, the surfaces of the conductor rails are also located on different radial surfaces, for example. In this case, the power switch members are arranged with the side of the supporting area on said conductor rail surfaces. Contrary to solutions in which the supporting surface of the power switch members is placed on the perimeter of the housing (as is the case in GB 1 207 666 A, FIGS. 8 and 9, for example), an arrangement parallel to a radial surface of the housing does not require extensive assembly and preparation of the power electronics without housing or subsequent mounting of the power electronics on the housing. Moreover, said arrangement requires relatively fewer expenditures, since a peripheral arrangement does not require, for example, peripheral flattenings, which are generally customary. The direct current and coil exit rails are thermally connected with a heat sink. Due to the generally high thermal capacity and performance of said rails, the direct arrangement of the power semiconductor on said rails serves as a thermal reduction of peak temperatures. In some embodiments, a cooling channel running along the outer perimeter of the housing creates the heat sink.

In other embodiments, at least one conductor rails is shaped like a duct with a flat rectangular diameter receiving a coolant. In some of these embodiments, part (e.g., half) of the power switch members is placed directly on said internally cooled conductor rail (e.g., the positive conductor rail) and is thus directly cooled, whereas the other part (e.g., the other half) of the power switch members is placed on the coil exit rails, for example, where it is indirectly cooled by an insulating surface located between the conductor rail and the coil exit rail. Said indirect cooling generally suffices. In other embodiments, the conductor rail hosting none of the power switch members (e.g., the negative conductor rail) is cooled internally in order to create an even cooling of all power semiconductors. This indirectly cools the other conductor rail (e.g., the positive conductor rail on which one half of the power switch members rests) and the coil exit rails (on which the other half of the power switch members rests) to approximately the same extent.

In certain embodiments, the cooling channel running along the outer periphery of the housing, or the cooling channel created by the duct-shaped conductor rail, is intended to connect the cooling circuit of the motor vehicle combustion engine of the electric machine. Said electric machine and the power electronics are then also cooled by the cooling system of the combustion engine.

In certain embodiments, each power electronics unit is provided with a half bridge circuit. A half bridge circuit basically comprises two power switches connected in series from the positive potential to the negative potential. The coil exit is connected between both circuits. At any given moment, no more than one circuit is closed. The connected end of the coil or coil group is located on the positive potential, or alternatively on the negative potential, depending on which circuit is closed. Both circuits are alternately turned on and off with a variable pulse-width, thus making it possible to select variable effective voltages. Said circuit is called a "semiconductor" since it only wires one coil end. In some of the embodiments, the opposite ends of the coils or coil groups are electrically connected with a star connection. An adequate connection could comprise, for example, a neutral connector ring running along the perimeter. An alternative could consist of a direct connection of the coil ends in the area of the connector line. The star connection could also be replaced by a so-called triangle connection, in which the far end of a coil or coil group facing the half bridge circuit would comprise another half bridge circuit, and each half bridge circuit being connected with two coils or coil groups of different partial phase windings. Instead of a half bridge circuit, a full bridge circuit could be used, fully connecting or separating one end of a connected coil or coil group with the positive potential, and the opposite end with the negative potential. A full bridge circuit is basically created with a half bridge circuit on both ends of a coil or coil group.

The power electronics units of certain embodiments also each have at least one driving circuit for the power switch drive supplying the appropriate switch signal for the power switches. An appropriate bus, which transfers control data, controls the driving circuits of the electric machine. In certain embodiments, each drive switch of a partial phase winding is provided with a separate bus, whereas in other embodiments, all drive switches of the winding have one collective bus. By means of appropriate addressing, it can be secured that only the control switches belonging to a certain partial phase winding are addressed. It is basically possible to have the bus assert the corresponding turn-on and turn-off points of the drive switches in real time by means of corresponding timed and addressed data signals. The bus then operates on a dock frequency time scale. In order to avoid possible EMP problems, the bus can also be operated with low frequency by having it assign the desired time schedule of the pulse-width of the drive switches, and additionally assert the system clocking (e.g., by means of synchronization signals), and a drive switch configuration switching the power switches into the desired pulse-width based upon these data.

Moreover, the power electronics units of certain embodiments each have at least one capacitor connecting the positive and the negative potential. In the present invention, said capacitors are referred to as "indirect capacitors", even though strictly spoken, there is no "indirect circuit" in many cases because the direct current rails are directly connected, i.e., without intermediate by connecting a voltage transformer and so on, with a battery, for example. The individual indirect capacitors are connected in parallel, meaning that, in a static case, they can be regarded from an electric perspective as a large indirect capacitor with a capacity equal to the sum of the individual capacities. However, the inductivities of the capacitor supply lines should also be considered for the transient actions in this case, meaning that it is favorable to divide one large indirect capacitor into several smaller ones and place them directly at the power switches. Since the indirect capacitors also have a stray power (typically $\frac{1}{10}$ of the stray power of the semiconductors), they are connected, thermally for example, with the above-mentioned heat sink for the purpose of heat elimination.

The electric machine of certain embodiments is intended to be tightly connected with the crankshaft of the combustion engine or an axle drive shaft in the drive branch of the motor vehicle, i.e., permanently rotating with the shaft. In an embodiment as a crankshaft machine, the electric machine is configured to rest concentrically on a crankshaft and, more specifically by way of example, where the coupling of motor vehicles with shift transmission is located, or the so-called semi-flexible tile in case of a motor vehicle with automatic transmission. The electric machine of certain embodiments merely acts as a generator, and in other embodiments, merely like an engine. In other embodiments, the electric machine can alternatively act as a generator and an engine, thus mainly serving as a combined starter-generator. Furthermore, said starter-generator can also be designed for other generator and engine functions, e.g. as an electric brake system for the motor vehicle, or a support system for the combustion engine when a high performance is needed.

FIG. 1 is a schematic view showing, by way of example, the creation of an approximate sinusoidal current with a clocked pulse-width modulated voltage from a constant voltage source by means of clocked voltage. The pulsed voltage curve is supplied with a half bridge circuit (FIG. 3) switching one end of a coil or coil group back and forth in a clocked way between the positive (U+) and negative (U−) voltage. In case of a fixed clock frequency, the pulse-width modulation is sine-weighted, i.e., the length of the pulses is selected in such a time variable way that the time average determination would more or less result in a sinusoidal voltage curve with a desired frequency, amplitude and phase. FIG. 1 assumes that the opposite end of the coil or coil group in question is at zero potential, which represents a good exposure for the zero point (FIG. 3) of a star connection, for example. The electric machine acts as a low-pass because of the inductivity, meaning that the machine current flowing through the winding does not directly follow the clocked voltage curve, but creates a time average—apart from a phase displacement between the voltage and the current (not shown). Hence, FIG. 1 illustrates how an alternate current can be created from a constant voltage source by means of two fast power switches, allowing to set any curve shape, amplitude, frequency and phase by simply selecting the appropriate switch points.

Figure 2:
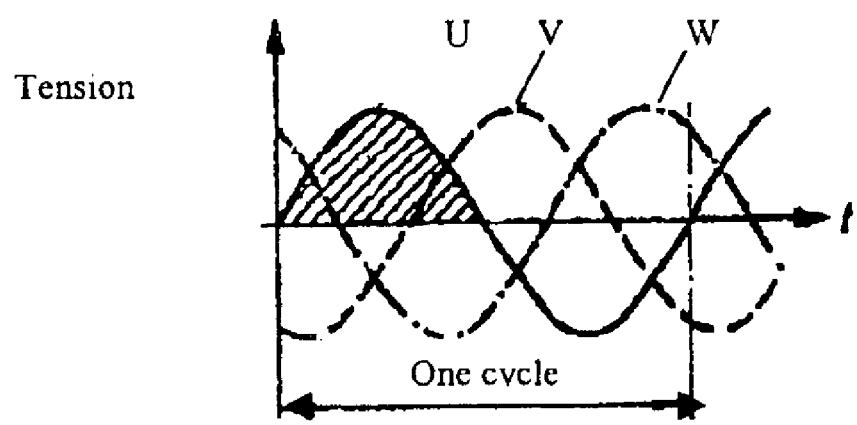
FIG. 2 shows voltage curves of a three-phase system.

In order to create a rotary housing field in an electric machine, the number of partial phase windings of the machine must correspond with the number of phases, and operate in a polyphase system in such a way that each partial phase winding is provided with one of the phase voltages. FIG. 2 shows, for the purpose of illustration, the voltage ratio in the most common three-phase system for the purpose of illustration, in which the sinusoidal voltage curve of each of the three phases is offset against each other in a phase angle of 120°. The phase offset of phase systems with a higher number of phases (e.g., 5, 7, 12, etc.) is accordingly smaller (e.g., 30° for a 12-phase system).

Figure 3:
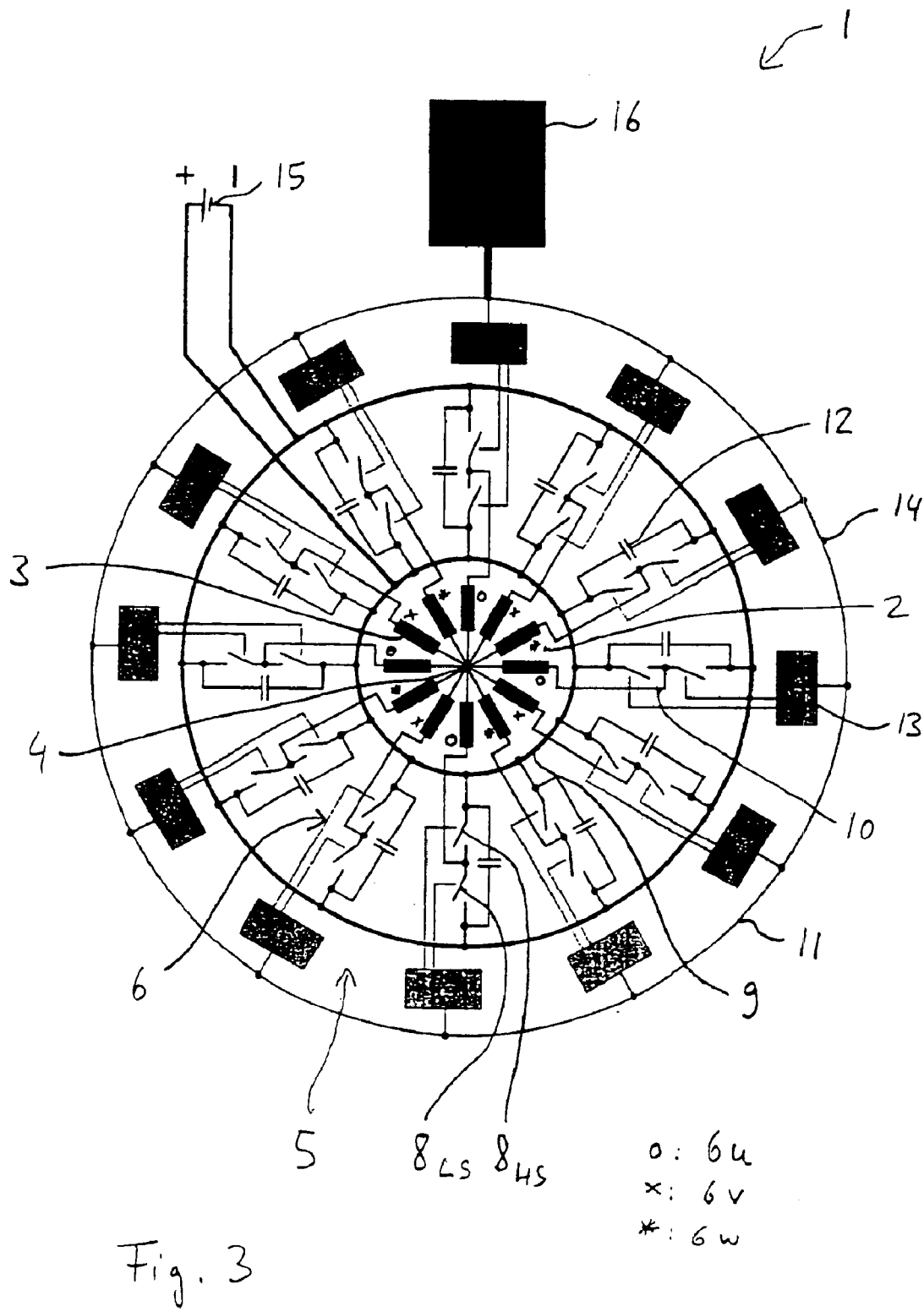
FIG. 3 shows a wiring diagram of an induction machine with spaced power electronics units.

A three-phase machine will now be described in further detail, whereby the analogies with machines for more than three phases will be clear to those skilled in the art. The winding of a three-phase machine comprises three partial phase windings, each to be supplied with the alternate currents referenced to in FIG. 2 as U, V, and W. In a machine controlled by a current inverter, each of the three voltages will be created by a pulse-width modulated docked voltage following FIG. 1, wherein the switch times for each of the three phases are selected accordingly in order to achieve the desired phase angle offset. A conventional current inverter, like the one from WO 97/08456, by way of example, requires a half bridge for each partial phase winding, i.e., a total of six power switches, or six parallel switches of power switches inside the current inverter, respectively. FIG. 3 shows a wiring diagram of an electric induction machine 1. The winding 2 of said machine comprises 12 coils 3, which are electrically connected with each other by means of a star connection in a so-called zero point 4 on one coil end. The opposite ends are electrically connected with a power electronics unit 5. Since this involves a three-phase machine, the winding 2 is configured in such a way that it comprises three partial phase windings 6u, 6v, 6w, each created by four coils 5. Therefore, the machine shown in FIG. 3 is a machine with four pairs of poles. In a conventional three-phase machine, e.g., like the one described in WO 97/08456, with four pairs of poles, the four coils of each partial winding would be tightly wired in a parallel switch, and each partial phase winding would be supplied by a phase part of a current inverter with a clocked pulse-width modulated voltage of FIG. 1, creating one of the phase voltages illustrated in FIG. 2. The present embodiment of FIG. 3 uses a different option, in which not all partial switches of the current inverter are assigned to complete partial phase windings, but to individual coils or coil groups. Following FIG. 3, each coil 3 has its own power electronics unit 5.

Figure 4:
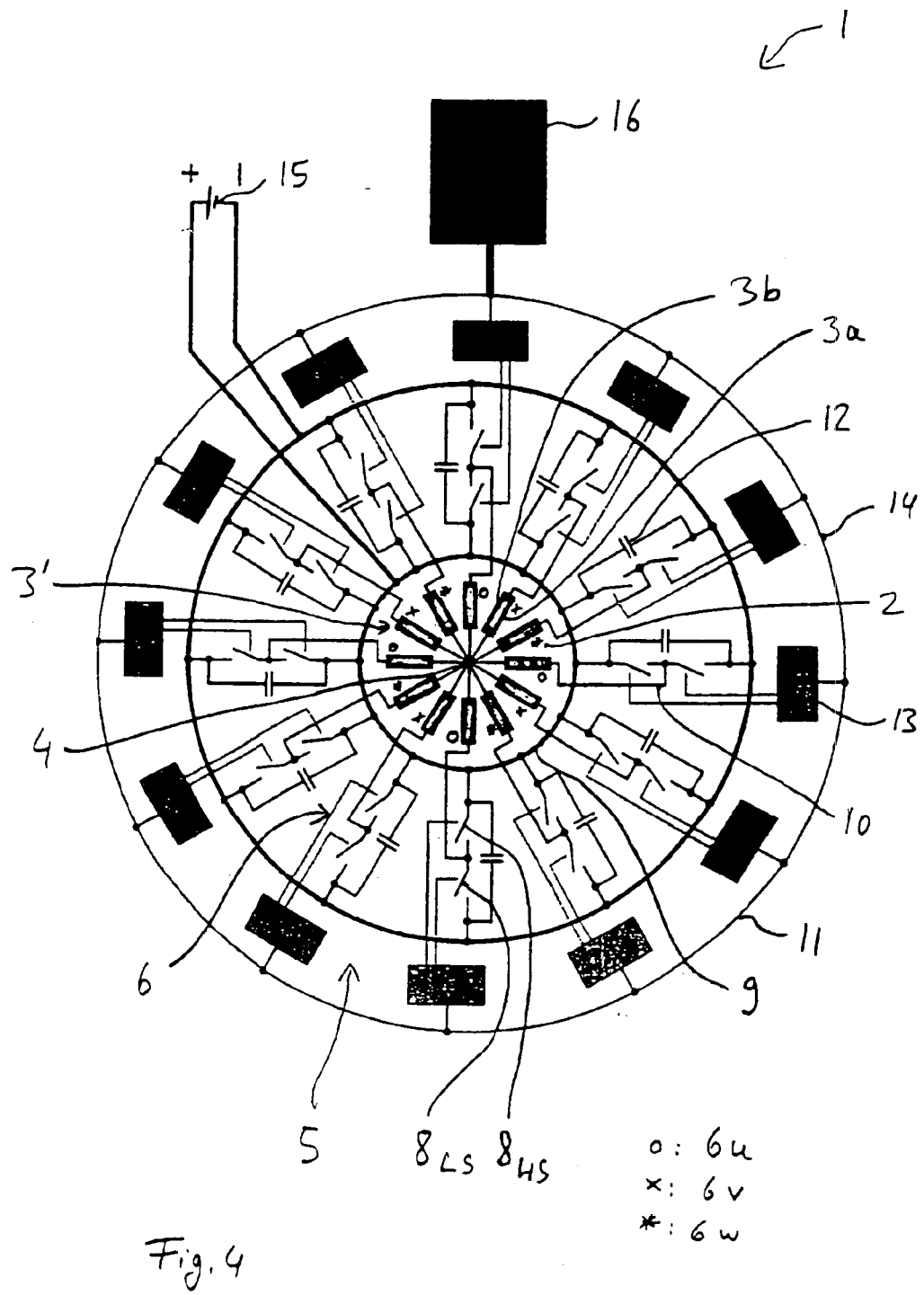
FIG. 4 shows an embodiment similar to FIG. 3, but comprising coil groups instead of coils.

An alternative embodiment of FIG. 4 does not comprise coils 3, but a coil group 3' created by connecting two coils 3a, 3b in parallel; consequently, each coil group 3' has its own power electronics unit 5.

The power electronics unit 5 is a half bridge circuit 7, in which a serial connection composed of two power switches 8 is located at the direct distribution voltage. The power switches 8 can be MOSFETs, for example, or other controllable switches like IGBTs, thyristors, etc. A positive conductor rail 9 and its drain connection D connect the source connection S of the power switch 8 located at the high voltage side, the so-called HS-switch $8_{US}$ ("HS" stands for "High Side") to a coil exit 10. A negative conductor rail 11 and its drain connection D connect the source connection S of the power switch 8 located at the low voltage side, the so-called LS-SWITCH $8_{LS}$ ("LS" stands for "Low Side") with the coil exit 10. In return, each coil exit 10 is connected with one end of the coils 3 or coil groups 3'. Moreover, each power switch unit 5 is connected with an indirect capacitor 12 connected in parallel with both power switches 8, i.e., between the positive conductor rail 9 and the negative conductor rail 11. Furthermore, each power electronics unit 5 has a triggering switch 13 comprising drive switches controlling the power switch 8, whereby said triggering switch 13 is connected with the gate connection of the power switches 8. The triggering switches 13 are coupled with a continuous data bus 14. This means that the direct current rails 9, 11 connect the electric machine 1 with a power source, e.g., a battery 15. On the other side, the data bus 14 is coupled with a micro-controller 16 controlling the triggering switches 13 in such a way that they attach one of the actual phase voltages shown in FIG. 2 to each partial phase winding 6u, 6v, 6w to the coils 3 or coil groups 3' by means of a pulse modulation. The single coils 3 or coil groups 3' of a partial phase winding 6u, 6v, 6w therefore act as if they were wired in parallel with each other. However, each coil 3 or coil group 3' has its own power electronics unit 5, in such a way that only a partial current of the current for one phase, i.e., the partial current flowing through the corresponding coil or coil group 3', flows through a power electronics unit 5.

For reasons of clarification, it is also pointed out that the wiring diagram of a three-phase machine with four pairs of poles of FIG. 3 resembles the wiring diagram of a 12-phase machine with one pair of poles, whereby the controls and construction of said electronic machine are different. A 12-phase machine has 12 partial phase windings, each having its own current inverter part supplying the specific alternate current (with displaced phases relative to all other phases) needed for this partial phase winding. Even though the wiring diagram of said conventional 12-phase machine is similar to that of FIG. 3, the controls of said 12-phase machine would be different from a three-phase machine with four pairs of poles by the fact that the current of all coils in the first case are phase displaced, whereas in the latter case, phase identical currents flow through the coils of a partial phase winding. Since the winding of said 12-phase machine is different, the construction is also different: In a 12-phase machine with one pair of poles and, for example, a full-pitch winding, the coil sides of each coil are placed opposite of the perimeter. This means that the connector lines of the coils run along the diameter of the housing. When the number of phases drops and the number of pairs of poles consequently increases (e.g., three phases and four pairs of poles), each pair of poles disposes only of the corresponding fraction of a complete circle (in this example, one quarter of 360°, i.e., 90°), meaning that the connector lines no longer run along the diameter, but only along a section of the circle equal to 90°. The connector lines of the three-phase machine with four pairs of poles are therefore shorter than those of a higher-phased three-phase machine without coils connected in parallel in partial phase windings.

Figure 5:
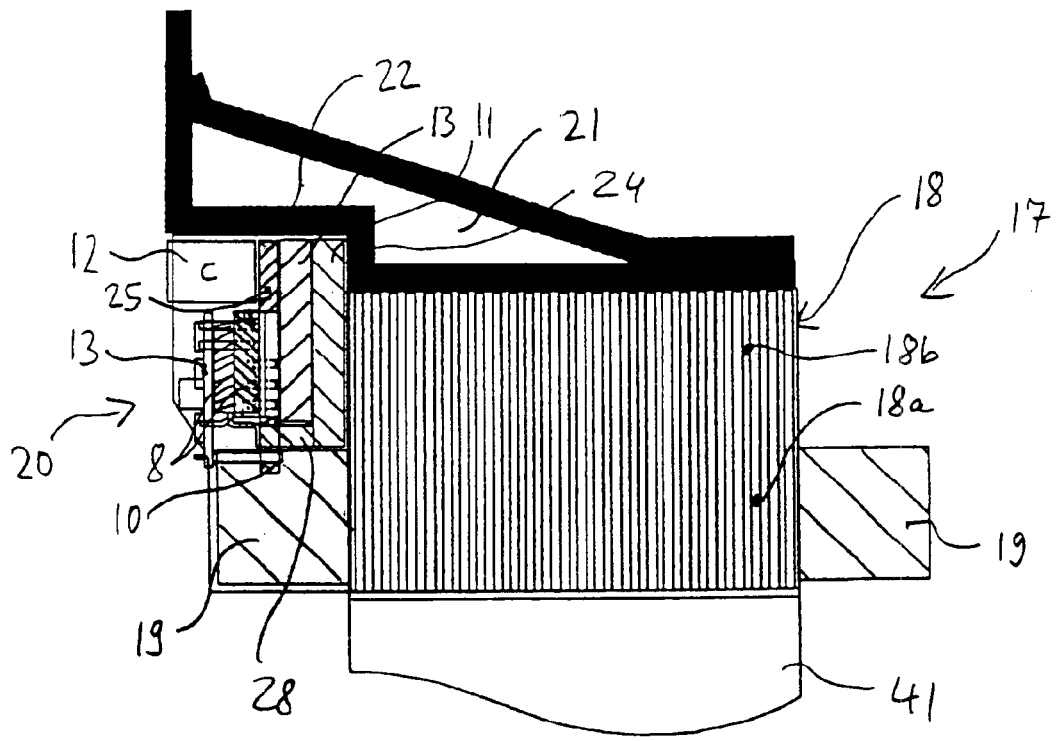
FIG. 5 shows a sectional view of a housing with a power electronics unit.
Figure 6:
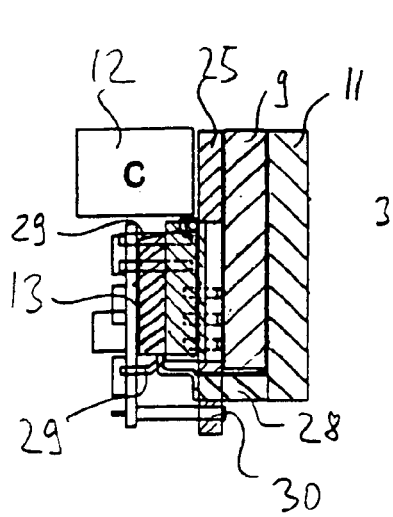
FIG. 6 is an enlarged sectional view of the power electronics unit of FIG. 5.
Figure 7:
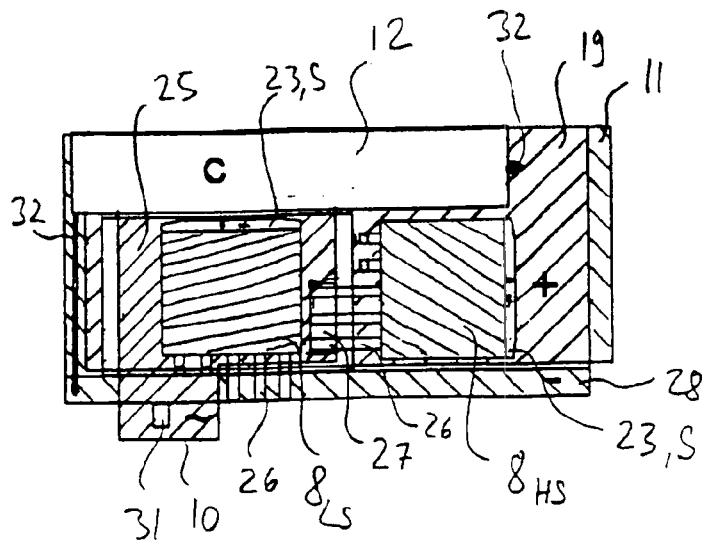
FIG. 7 is a top view (of the power section) of the power electronics unit of FIGS. 5 and 6.

FIGS. 5 through 7 show the spatial layout and arrangement of the power electronics units 5, whereby FIG. 5 is a sectional view of a housing with a power electronics unit, FIG. 6 a corresponding enlarged sectional view of a power electronics unit, and FIG. 7 a top view of a power electronics unit without triggering switch (and with the lateral positive direct current rails removed so the negative direct current rail, which is actually hidden, can be seen).

FIG. 5 is a sectional view of a housing 17 of the electric machine 1 with a power electronics unit 5. Said electric machine 1 has a housing body 18, which is arranged radially on the inside and opposite of an armature 41, which is only shown as a diagrammatic section of FIG. 5. The armature can be a short-circuit armature (in case of an asynchronous machine), for example, or an armature provided with permanent or electromagnets (in case of a synchronous machine). The housing body 18 is made of a sheet metal assembly layered around the axis. It comprises slots arranged in a slot area 18a located in an internal radial area and basically resting on radial surfaces. Even though the paper surface of FIG. 5 presents such a radial surface, said figure does not show a slot since the cutting plane in this figure runs between two slots. The back 18 of the housing, i.e., the radially exterior part of the housing body, does not have any slots, but rather guides the magnetic return in the direction of the perimeter.

The slot area 18a inside the housing body has coils 3, of which the coil sides resting in the slots with slot lines (not shown). The slot lines of both coil sides of a coil 3 are connected by connector lines running along the face and creating connector heads 19 on both sides of the housing body 18 in an axial direction. Since the winding 2 comprises several overlapping coils 3, such as described in detail in WO 01/95461 A1, for example, not only the connector lines of a coil 3 run in the connector head 19, but also those of several overlapping coils 3. Even though, in principle, embodiments can comprise a wire winding, the embodiments described in further detail below are made of structural parts. In this case, the connector lines are, for example, leaf shaped, i.e., flatter and wider than the slot lines, enabling them to overlap in a combing pattern inside the connector head 19, as described in further detail in WO 01/95461 A1. Said winding arrangement allows for extremely compact connector heads 19, which do not need the radial space 20 outside the connector 19 and the axial space 20 at the face of the back 18b of the housing. The connector heads 19 of less common embodiments with a wire winding can also be configured in such a way that a space 20 is made available in the axial direction in front of the back 18b of the housing, as shown in FIG. 5.

In the embodiments described in further detail below, the electric machine 1 is a radial field machine with an internal armature, as shown in FIG. 5. In other embodiments (not shown), said electric machine 1 has an external armature, in which the slots are opened in a radial outward direction and closed in a radial inward direction, and said space 20 is radially located inside the connector heads. For the rest, all of the present embodiments apply by analogy to said exterior armature machines.

The clearance 20 made available by the connector heads creates an annular space, in which the direct current rails 9, 11 and the power electronics units 5 are placed. Said direct current rails 9, 11 are shaped like relatively flat loops with the flat side resting in radial surfaces. They are coated with an electrical insulation coat. The negative conductor rail 11 is located directly at the face of the back 18b of the housing, and is immediately followed by the positive conductor rail 9, followed yet again by coil exit rails 25 placed in sections. On the outside radius of the housing body lies a cooling channel 21 rotating around the perimeter and also radially extending across the space 20. The cooling channel 21 is connected with a cooling circuit, e.g., at the existing cooling circuit of the combustion engine. Said cooling circuit will be described in further detail in FIG. 13. The radially exterior perimeter surface of the direct current rails 9, 11 and the coil exit rails 25 are in thermal contact with a cooling wall 22 of the cooling channel 21. The heat conducting negative conductor rail 11 is two-dimensionally arranged at the face of the housing body 18 and provides additional cooling of said rails 9, 11, 25. In turn, the walls 22 of the cooling channel 21 cool the negative conductor rail 11. Since both direct current rails 9, 11 are in thermal contact, both mutually and with the coil exit rails, the positive conductor rail 11 and the coil exit rails 25 provide additional heat dissipation through the positive conductor rail 9.

The power switch members 8 used, by way of example (e.g. MOSFETs) are configured in such a way that one of the housing connections is configured as a contact area 23. As described in further detail by FIGS. 6 and 7, the contact area of the power switches is directly placed (i.e., without intermediate connection of an electric insulation rail) on the positive conductor rail 11 or coil exit rails 25 in such a way that they are in electric and thermal conducting contact with said connectors 11, 25. The contact areas are thereby oriented in such a way that they are located in a radial surface of the electric machine. Since the conductor rails 9, 11 and the coil exit rails 25 have a relatively larger diameter and are generally made of a material with a high thermal conductivity and thermal capacity (e.g., copper or a copper base alloy), this arrangement provides excellent cooling of the power switches, not only during continuous operation, which essentially has a constant stray power (which could range from 20 to 40 Watt for typical arrangements), but also during performance loss peaks, as might occur when starting the vehicle, for example.

In some embodiments, the triggering switch 13 is placed directly on the power switches 8, resulting in possibly short electronic connections between the triggering switch 13 and the power switches 8. Finally, each power electronics unit 5 has an indirect capacitor 12, which is, for example, in thermal conductive contact with the cooling wall 22 located on the outside radius of the triggering switch 13 and in front of the axis of the direct current rails 9, 11 and the coil exit rails 25, as shown in FIG. 5.

The complete power electronics unit 5 composed of the above-mentioned parts, including the conductor rails 9, 11 and the coil exit rails 25, is completely or mainly located in said clearance 20 made available by the connector head 19. In case additional space is needed, the power electronics unit 5 can stick out in an axial direction over the connector head 19, and/or the cooling wall 22 of the cooling channel 21 can create an offset bend 24 of conduit in a radially outward direction, as shown in FIG. 5. The offset bend of conduit 24 furthermore expands the thermal contact area between the negative conductor rail 11 and the wall 22, and thus enhances the cooling of the power electronics unit 5. Other embodiments (not shown) are not provided with said offset bend of conduit 24. In these embodiments, the cooling wall 22 creates a continuously flat perimeter.

As shown in further detail in FIGS. 6 and 7, the connecting lines created by the direct current rails 9, 11 and the coil exit rails 25 placed in sections along the perimeter, are arranged in an axially layered pattern. This results in a connector structure located along the perimeter and followed by an axially lower-lying area, in which the positive conductor rail 9 creates the axially outer conductor area, and followed yet again by a further outward lying area with a conductor exit rail 25. In accordance with this sectional layered structure, the power switches $8_{US}$ and $8_{LS}$ soldered onto the positive conductor rail 9 and the coil exit rail 25, are placed on two different levels. The HS-power switch $8_{US}$, which has a contact area 23 creating the source connection S, is soldered on the positive conductor rail 9 in one of the recesses between two coil exit rails 25. It is placed in such a way that the connector wires 26 creating drain connector D are electrically connected (e.g. soldered) with the corresponding coil exit rails 25. The coil exit rail 25 can have a recess 27, allowing for a relatively large-surface connection of the drain connector wires D with the coil exit rails 25, without having to bend the wires. In other embodiments, the recess can be dropped and the wires can be bluntly connected or with a flat bend with the coil exit rail 25, without having to bend the wires, for example. The LS power switch $8_{LS}$ is soldered onto the coil exit rail 25, whereby the contact area 23 creates the source connector S. Its connector wires 26 creating the drain-connection D are electrically connected (e.g., soldered) to the negative voltage rail 11. For this purpose, the end of said negative voltage rail 11 where the connector heads are located, has a collar 28 extending in an axially outwards direction. Said collar 28 grabs the positive conductor rail 9 from below. The drain connector wires 26 of the LS-power switch $8_{LS}$ are directed along the face of said collar 28. The LS-power switch $8_{LS}$ is therefore located in a degree of 90° across from the HS-power switch $8_{HS}$. Finally, the power switches $8_{LS}$ and $8_{HS}$ comprise gate-connector wires 29 extended outward in an axial direction and connected with the triggering switch 13, which is placed around the axis of the power switches 8a, 8b. In other embodiments (not shown), the power semiconductors are bonded directly, i.e., without housing, on the rails with a connecting surface (source); the other connectors (drain, gate) are bonded on the semiconductors.

Since the control of the electric machine 1 (especially in case of an asynchronous machine) is relieved once the actual current flow is known, at least one of the power electronics units 5 of each partial phase winding 6u, 6v, 6w (e.g. also all power electronics units 5) is provided with a current measuring head 30 extending like a peg, axially inward from the triggering switch 13 into a hole 31 in the coil exit rail 25. It has, for example, a Hall element for current measuring. Suitable connections 32 electronically connect the indirect capacitor 12 with the positive conductor rail 9 on one side, and the collar 28 of the negative conductor rail 11 on the other side. The data bus 14 can be created with a rotating data cable, for example, connected with each triggering switch 13. This is not shown in further detail in FIGS. 5 through 7.

The zero line connecting the individual coils of a star connection can have a small diameter, since basically no current flows through it. It is shown in the embodiment of FIG. 5 as a rotating zero line rail radially arranged inside the collar 28. Alternatively, the zero line can also be created by the specially configured winding structural parts, which are individually connected with the corresponding coil connection of neighboring coils, and thus create as a whole a continuous zero point 4.

Figure 8:
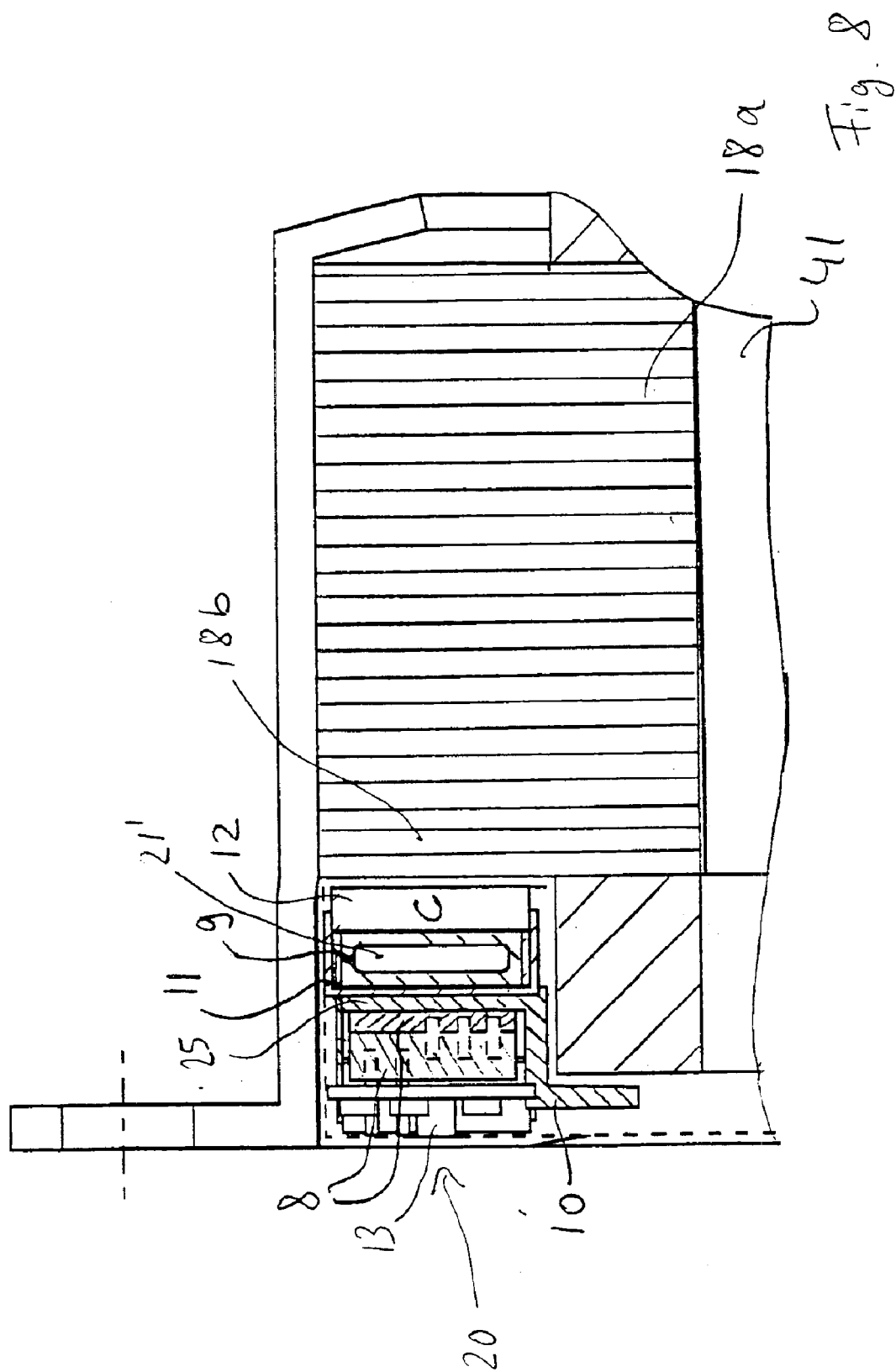
FIG. 8 is a view similar to FIG. 5 of a different embodiment having internal conductor rail cooling.

FIG. 8 is a view similar to FIG. 5 of a different embodiment with internal conductor rail cooling. The differences with FIGS. 5–7 will now be listed; for the rest, all other embodiments of FIGS. 5–7 also apply to the embodiment of FIG. 8.

The positive conductor rail 9 of FIG. 8 is shaped like a flattened rectangular duct receiving a cooling channel 21'. The negative conductor rail 11 grabs the diameter of the positive conductor 9 in a U-shaped way, and presents recesses receiving the power switch members 8 placed on the positive conductor rail. This means that the layered pattern of the conductor rails 9, 11 is a mirror image of the embodiment of FIGS. 5–7. The indirect capacitor 12 rests in an axial direction inside the positive conductor rail 9, and radially at the same level thereto. The U-shaped grasp of the positive conductor rail 9 creates the connection with the negative conductor rail 9. The housing post of this arrangement does not have an extension at its perimeter.

Figure 13:
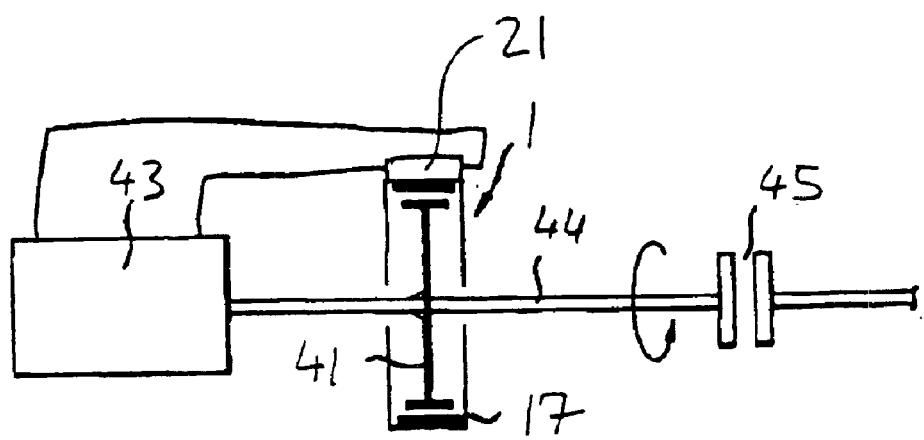
FIG. 13 is a diagrammatically very simplified presentation of a motor vehicle driving gear system comprising an electric machine configured as a starter-generator.

The cooling channel 21' is in turn again connected with a cooling circuit, e.g. at the existing cooling circuit of the combustion engine, as described in further detail in FIG. 13. The positive conductor 9 has direct internal cooling; the negative conductor rail 11 and the coil exit rails 25 are in thermal contact with the internally cooled positive conductor rail 9 through the insulating surfaces lying between them.

Figure 9:
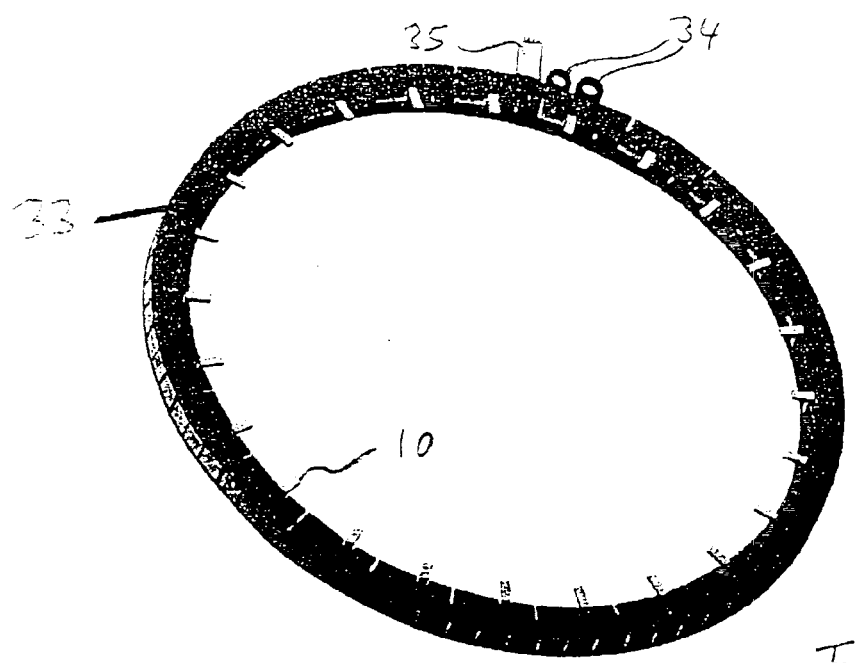
FIG. 9 is an exploded view of a pre-assembled power electronics unit.

FIG. 9 is an exploded view of a pre-assembled power electronics structural component 33 in an annular design composed of a plurality of power electronics units 5 placed next to each other on the direct current rails 9, 11. The example shown in FIG. 9 comprises 24 of said power electronics units. This means that this structural component has, e.g. eight coils per partial phase winding in case of a three-phase machine, each having its own power electronics unit 5. A peg-like coil exit 10 runs radially inwards from the coil exit rail 25. The power electronics structural component 33 has two clamps 34, which are located somewhere along the perimeter and are part of the positive conductor rail 9, or negative conductor rail 11, respectively, and serve to connect a direct current source. Furthermore, it has a data connector 35 connecting the data bus 14 with a control apparatus or a data line running to a control apparatus.

Figure 10:
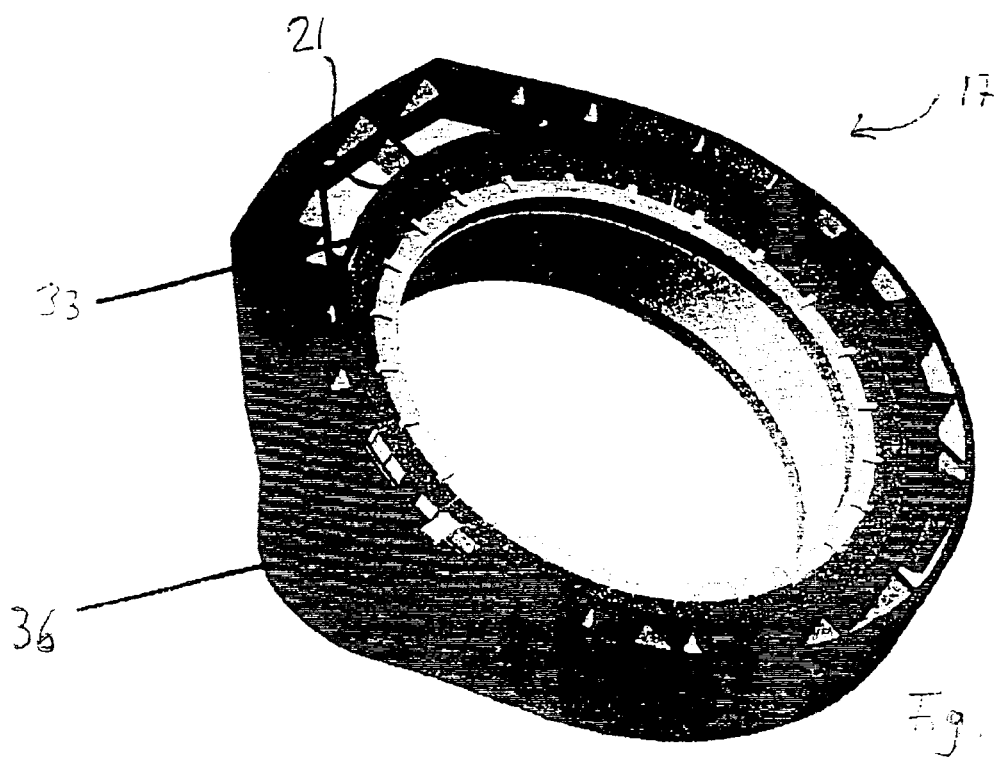
FIG. 10 is an exploded view of an (opened) housing, in which the power electronics unit of FIG. 9 has been mounted.

FIG. 10 is an exploded view of an (opened) housing 17, in which the power electronics component 33 of FIG. 9 has been mounted, and in which the cooling channel 21 running in an angular nozzle pattern around the back of the housing 18 is visible. A control apparatus for the power electronics units 5 is integrated in a cavity 36 in the housing where the clamps 34 and the data connector 35 is located. The connector clamps 34 for the battery terminals also extend from the same location.

Figure 11:
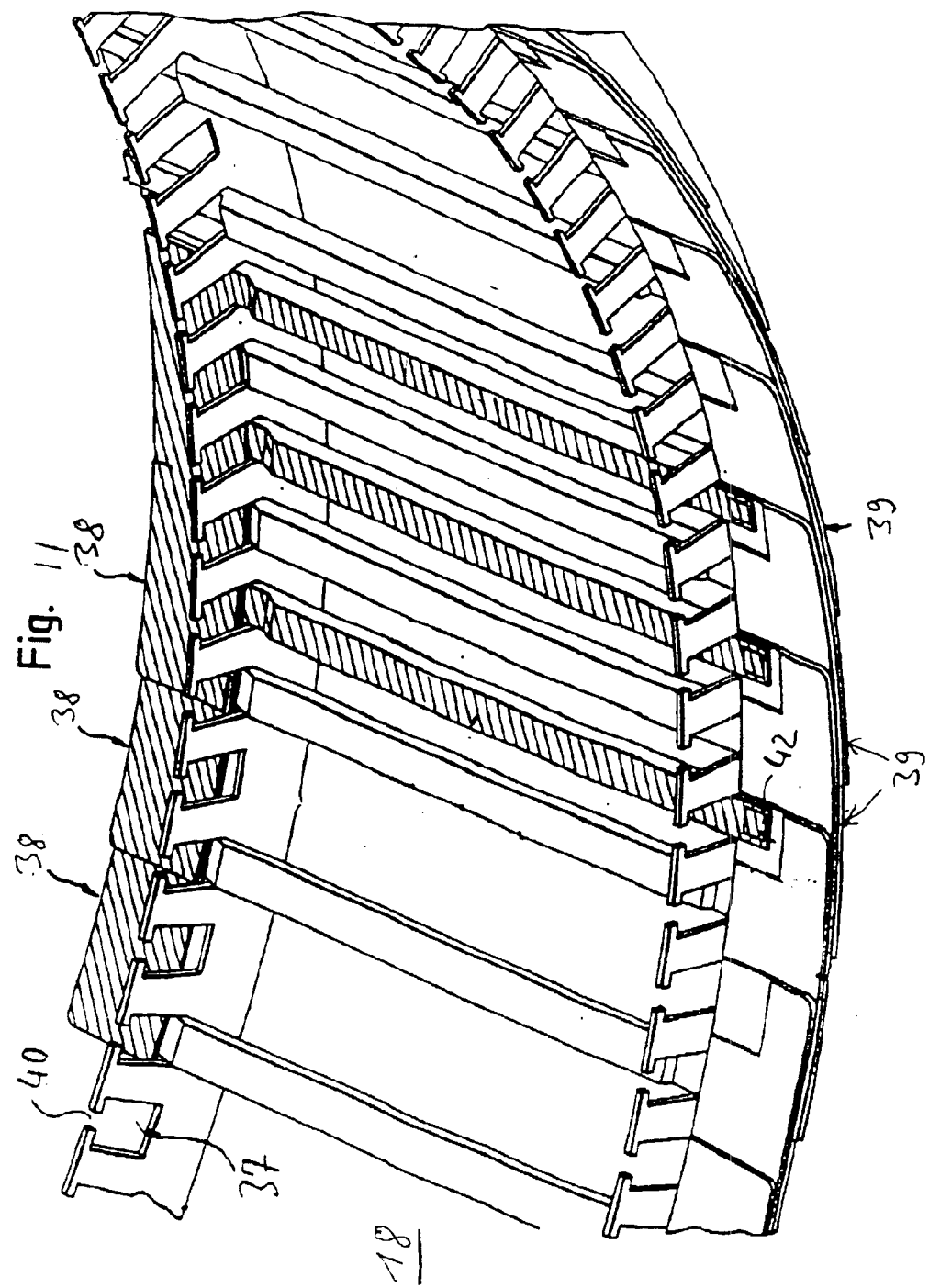
FIG. 11 is an exploded view of a housing section of the electric machine with slots comprising L-shaped structural parts.

FIG. 11 illustrates a winding arrangement composed of L-shaped structural parts by means of an exploded view of a housing section of the electric machine seen from an oblique angle inside the slot area 18a of the housing 17. The machine type is yet again a radial field machine with an internal rotor design, in which the slots 37 are filled with structural parts 38, 39. The figure only shows both face sides of the housing body 18 in order to make the actual winding better visible. It is indeed again very solid and typically composed of layered electric metal sheets. Each side of the face of the housing body 18 therefore corresponds with an outer sheet metal of the sheet metal unit. The structural parts 38, 39 are placed in the slots 37 immediately above the slot bottom. The heads 40 of said slots 37 are narrowed in such a way that the L-shaped structural parts 38, 39 can only be inserted in the slots in an axial direction. The face side facing the viewer is already provided with a layer of structural arts 39 and the opposite face is provided with three structural parts 38. Each time when a complete layer of said structural parts has been inserted, the structural parts are connected (e.g., welded, soldered, etc.) with each other at junctions, resulting in a completed winding with two spiral-shaped connected coils with cogged interlaced compact connector heads 19. Details about the construction of said winding can be found in WO 01/95461 A1 mentioned earlier.

Figure 12:
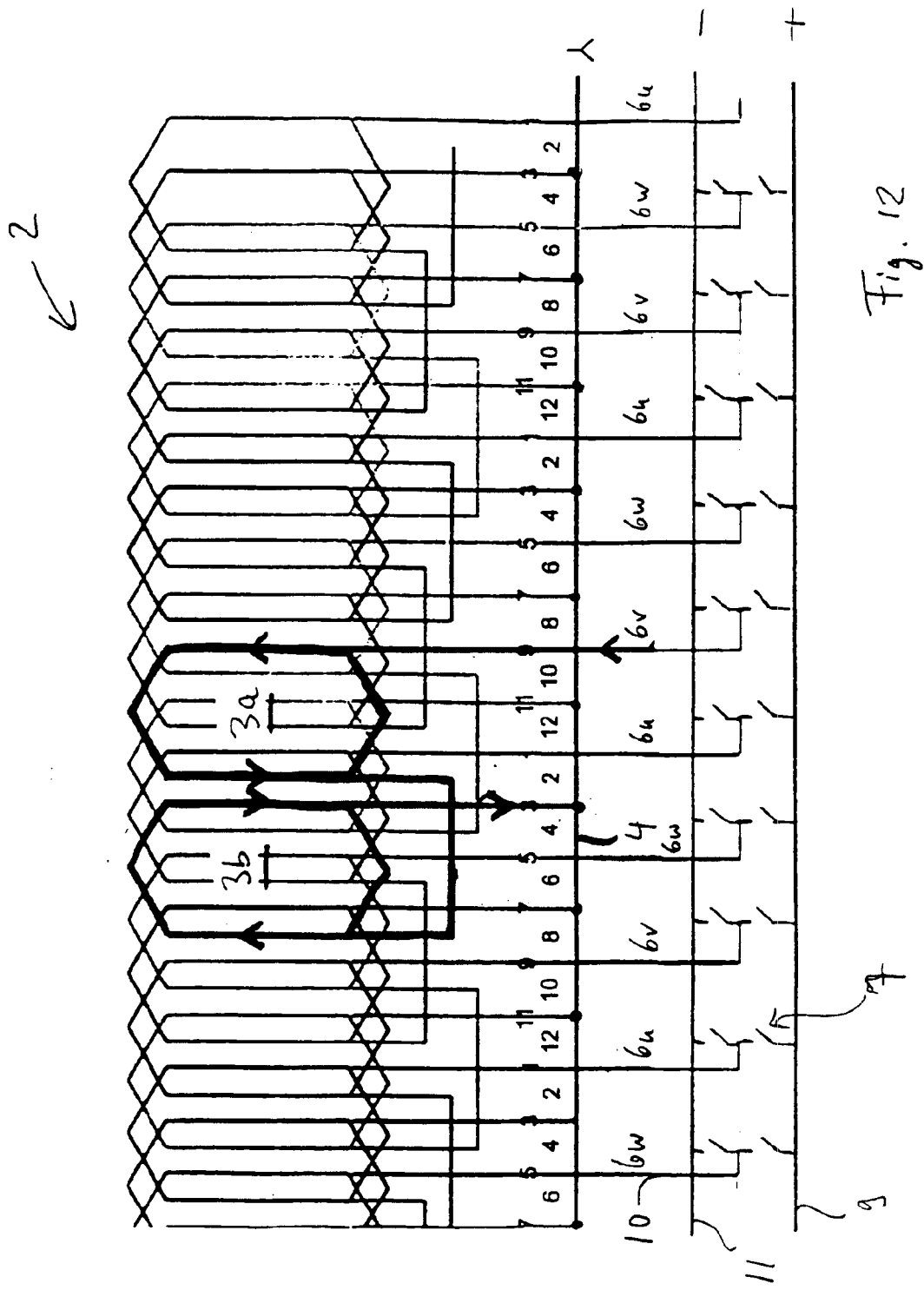
FIG. 12 is a winding diagram of a rotary field winding, by way of example.

FIG. 12 is a winding diagram of a rotary field winding presenting an example of an embodiment of the winding 2. It shows how the individual coils are distributed over the slots 37 of the housing body 18, whereby each slot 37 of the winding 2 only contains one coil side (single layer winding). The winding diagram shown is repeated every 12 slots. A coil 3 of a partial phase winding, i.e., 6v is printed in bold in FIG. 12 for the purpose of clarification. The section shown here comprises three coils 3 belonging to this partial phase winding 6v, and each made of two partial coils 3a, 3b connected in series—they are indeed helixes with eight windings, for example. Each coil 3 has its own power electronics unit 5. Each opposite coil end of the coils 3 is connected with the zero point 4. Both partial coils 3a, 3b are connected in series and laid out in such a way that, at a certain moment, the current flows in the direction of the slot head in one partial coil 3a, and in the direction of the slot bottom in the other partial coil 3b (indicated with arrows). Thanks to this series connection, the coils 3 connections, i.e., the connection with the coil exit 10 and the connection with the zero point 4, are located on the same radial side of the connector head 19, and specifically on the radially outer side, for example, which makes it easier to connect the power electronics units 5 at this location. In other embodiments (not shown), a plurality of such pairs of partial coils can be connected in series. Individual coils can also be used as an alternative. In this case, one coil end is located on the radially interior side of the connector head 19 and can be guided to the power electronics units 5 by means of a crossing located on the outer side.

FIG. 13 shows a driving gear system of a motor vehicle comprising a crankshaft starter-generator created by an electric machine 1. Said driving gear system comprises a combustion engine 43 delivering the torque to the driving wheels of the motor vehicle by means of an axle drive shaft 44 (e.g. the crankshaft), a coupling 45, and other parts (not shown) of a drive branch. The electric machine 1 operating as a starter and a generator is placed on the axle drive shaft 44 by means of tightly connected armatures. The cooling channel 21 of the housing 17 is part of the cooling circuit of the combustion engine 43, in which the common coolant pump, which is generally powered by the combustion engine, also makes the coolant circulate in the cooling channel 21. The partial cooling circuit running to the electric machine 1 can alternatively be provided with its own coolant pump, which can be electrically driven, for example, and therefore operates independently from the instantaneous revolutions of the combustion engine.

The embodiments shown do not require a current inverter. The power electronics are directly integrated in the housing, thus requiring less expenditures, space and weight, which distinguishes them in a favorable way from solutions following the state of the art. Furthermore, the coils or coil groups of a partial phase winding all have their own power electronics units, which makes them more fail-safe since said machine can also continue to operate when one or a few of said power electronics units fail.

All publications and existing systems mentioned in this specification are herein incorporated by reference.

Although certain products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. An electric machine including a starter, generator, or a starter-generator for a motor vehicle, presenting a housing and comprising:
    a winding with coils or coil groups, including connector heads;
    power electronics units with power switch components distributed along the perimeter of the housing;
    conductor rails connected with power electronics units;
    coil exit rails going from a power electronics unit to an associated coil or coil group;
    wherein the power electronics units are arranged on the face of the housing in a clearance created by the connector heads, which are located radially outside or inside the connector heads; and
    wherein the power switch components are arranged directly—without inserted electric insulation—on one of the power loops or a coil exit rail.

2. The electric machine of claim 1, wherein the contact area of the power switch components are arranged parallel with a radial surface of the housing.

3. The electric machine of claim 1, wherein the winding is a structural part winding.

4. The electric machine of claim 1, wherein the winding coils present different structural parts comprising connector heads made of layered structural part connector lines, wherein said connector heads comprise overlapping connector lines of a plurality of coils and extend outwards in an axial direction from a housing, and are thus retained in a radial direction outside or inside the clearance, providing a storage space for the power electronics units.

5. The electric machine of claim 1, wherein the power loops are arranged in the clearance created by the connector heads, and in which also the power electronics units are located.

6. The electric machine of claim 1, wherein at least one of the conductor rails and the coil exit rails on which the power switch components are arranged directly, are thermally connected with a heat sink.

7. The electric machine of claim 6, wherein said heat sink is created by a cooling duct coupling intended to be coupled with a cooling cycle of a combustion engine of a motor vehicle.

8. The electric machine of claim 1, wherein at least one of the conductor rails is shaped as a duct designed to host a coolant flow, and the power switch components are in thermal contact with at least one conductor rail containing a coolant.

9. The electric machine of claim 1, wherein the power electronics units present half bridge circuits, each electrically connected with one extremity of a coil or coil group, wherein the other extremities of the coils or coil groups are electrically connected, or wherein the power electronics units present full bridge circuits.

10. The electric machine of claim 1, wherein each power electronics unit also comprises at least one driving circuit triggering the power switch.

11. The electric machine of claim 10, comprising a bus triggering the driving circuit.

12. The electric machine of claim 10, wherein each power electronics unit comprises at least one indirect capacitor.

13. The electric machine of claim 1, arranged in such a way that an interior rotary field is created by means of a polyphase current and comprising a winding with a plurality of phase part-windings, wherein each phase part-winding comprises at least two coils, and wherein at least two power electronics units arranged at the perimeter of the housing are allocated to each phase part-winding, and wherein said power electronics units are separately connected electrically with different coils of the phase part-winding or different coil groups of the phase part-winding, thus only allowing part of the current of one phase to run through one power electronics unit.

14. The electric machine of claim 1, wherein said machine is designed as a crank machine, or a machine comprising self-bearings, creating the coupling with the connecting rod of the vehicle.

15. An electric machine designed as a starter, generator, or a starter-generator for a motor vehicle, having a housing, and comprising:
   a winding with coils or coil groups presenting connector heads;
   power electronics units distributed along the perimeter of the housing, and including power switch components;
   wherein the power electronics units are arranged on the face of the housing in a clearance of the connector heads, which are located radially outside or inside the connector heads; and
   wherein the components of said power electronics units comprise a support area, and both the power electronics unit and the support area are arranged on a contact surface;
   wherein said contact surface of the power switch components is arranged parallel with the radial surface of the housing.

16. The electric machine of claim 15, wherein the components creating the power switch are arranged directly—without inserted electric insulation—on one of the direct current loops or a coil exit rail.

17. The electric machine of claim 15, wherein the winding is a structural part winding.

18. The electric machine of claim 17, wherein the winding coils present different structural parts comprising connector heads made of layered structural part connector lines, wherein said connector heads comprise overlapping connector lines of a plurality of coils and extend outwards in an axial direction from a housing, and are thus retained in a radial direction outside or inside the clearance, providing a storage space for the power electronics units.

19. The electric machine of claim 15, wherein the power loops are arranged in the clearance created by the connector heads, and in which also the power electronics units are located.

20. The electric machine of claim 15, wherein at least one of the conductor rails and the coil exit rails on which the power switch components are arranged directly, are thermally connected with a heat sink.

21. The electric machine of claim 15, wherein at least one of the conductor rails is shaped as a pipe designed to host a coolant flow, and the power switch components are in thermal contact with at least one conductor rail containing a coolant.

22. An electric machine designed as a starter, generator, or a starter-generator for a motor vehicle, including a housing, and comprising:
   a winding with coils or coil groups presenting connector heads;
   power electronics units distributed along the perimeter of the housing and including power switch components;
   wherein the power electronics units are arranged on the face of the housing in a clearance of the connector heads, which are located radially outside or inside the connector heads;
   conductor rails connected with power electronics units;
   wherein at least one of the conductor rails is shaped as a pipe designed to host a coolant flow; and
   the power switch components are in thermal contact with at least one conductor rail containing a coolant.

23. The electric machine of claim 22, wherein the components creating the power switch are arranged directly—without inserted electric insulation—on one of the direct current loops or a coil exit rail (25).

24. The electric machine of claim 22, wherein the contact area of the power switch components are arranged parallel with a radial surface of the housing.

25. The electric machine of claim 22, wherein the conductor rail containing a coolant is designed to be connected with a coolant circuit of a combustion engine of a motor vehicle.

* * * * *